United States Patent
Xu

(10) Patent No.: US 9,521,086 B2
(45) Date of Patent: Dec. 13, 2016

(54) QUEUE SCHEDULING METHOD AND APPARATUS

(71) Applicant: Huawei Technologies Co., Ltd., Shenzhen (CN)

(72) Inventor: Xingli Xu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 342 days.

(21) Appl. No.: 14/171,178

(22) Filed: Feb. 3, 2014

(65) Prior Publication Data

US 2014/0146831 A1    May 29, 2014

Related U.S. Application Data

(63) Continuation of application No. PCT/CN2011/078022, filed on Aug. 4, 2011.

(51) Int. Cl.
*H04L 12/28* (2006.01)
*H04L 12/863* (2013.01)
*H04L 12/873* (2013.01)

(52) U.S. Cl.
CPC ............. *H04L 47/62* (2013.01); *H04L 47/522* (2013.01); *H04L 47/528* (2013.01)

(58) Field of Classification Search
None
See application file for complete search history.

(56) References Cited

U.S. PATENT DOCUMENTS

| 6,687,227 | B1 * | 2/2004 | Li ................... H04L 1/1835 370/231 |
| 2004/0004972 | A1 * | 1/2004 | Lakshmanamurthy .................... H04L 12/5693 370/413 |

(Continued)

FOREIGN PATENT DOCUMENTS

| CN | 1939005 A | 3/2007 |
| CN | 101325541 A | 12/2008 |

(Continued)

OTHER PUBLICATIONS

Chinese Office Action, Application No. 201180001481.2, dated Apr. 11, 2013, 10 pages.

(Continued)

*Primary Examiner* — Kwang B Yao
*Assistant Examiner* — Hardikkumar Patel
(74) *Attorney, Agent, or Firm* — Slater Matsil, LLP

(57) ABSTRACT

Embodiments of the present invention disclose a queue scheduling method and apparatus, which can not only implement scheduling of a large number of queues, but also ensure that the queues uniformly send service data. The method includes: determining whether service data exists in each to-be-scheduled data queue and determining whether the to-be-scheduled data queues are allowed to send data; if it is determined that the service data exists in the to-be-scheduled data queues and the to-be-scheduled data queues are allowed to send data, placing queue marks of the to-be-scheduled data queues into a mark queue; scheduling queue marks of the to-be-scheduled data queues from the mark queue in sequence, scheduling the to-be-scheduled data queues corresponding to the queue marks, and enabling the to-be-scheduled data queues corresponding to the queue marks to (Continued)

send service data not exceeding predetermined data amounts.

22 Claims, 6 Drawing Sheets

(56) References Cited

U.S. PATENT DOCUMENTS

| | | | |
|---|---|---|---|
| 2004/0213156 A1* | 10/2004 | Smallwood | H04L 12/5693 370/232 |
| 2004/0218617 A1* | 11/2004 | Sagfors | H04L 41/0896 370/412 |
| 2012/0017055 A1 | 1/2012 | Liao et al. | |

FOREIGN PATENT DOCUMENTS

| | | | | |
|---|---|---|---|---|
| CN | 101499973 A | 8/2009 | | |
| CN | 101741751 A | 6/2010 | | |
| CN | 101848149 A | 9/2010 | | |
| CN | 101902487 A | 12/2010 | | |
| CN | 102025639 A | 4/2011 | | |
| EP | 1549002 A1 | 6/2005 | | |
| EP | 2357764 A1 | 1/2011 | | |
| FR | EP 1549002 A1 * | 6/2005 | ......... | H04L 12/5693 |
| WO | 2005096546 A2 | 10/2005 | | |

OTHER PUBLICATIONS

Chinese International Search Report, Application No. PCT/CN2011/078022, dated May 10, 2012, 10 pages.

* cited by examiner

QUEUE SCHEDULING METHOD AND APPARATUS

This application is a continuation of International Application No. PCT/CN2011/078022, filed on Aug. 4, 2011, which is hereby incorporated by reference in its entirety.

TECHNICAL FIELD

The present invention relates to the field of communications technologies, and in particular, to a queue scheduling method and apparatus.

BACKGROUND

In devices for queue scheduling, such as routers or switches, service data packets to be sent need to be scheduled according to a certain rule, enabling each queue to obtain a fair scheduling opportunity, so that data of the queues can be sent uniformly. A conventional method adopts a weighted fair queue (WFQ). Specifically, the service data packets to be sent form queues at an input end of a scheduling device to wait for scheduling. First, an initial value (such as 0) of a response credit is preset for each queue participating in the scheduling. When a data packet passes through a queue, the response credit of the queue is accumulated correspondingly. For a single queue, the greater the number of bytes of the data packet passing through the queue is, the greater the accumulated response credit is. At the same time, a weight ratio is predefined for each queue, and the weight ratio reflects a priority of each queue, so that the response credit accumulated for a queue with a high priority is small when the data packet with the same number of bytes passes through the queue, while the response credit accumulated for a queue with a low priority is great when the data packet with the same number of bytes pass through the queue. In a queue scheduling process, a comparison operation is always performed on all the response credits, and a queue with the smallest response credit is selected and then scheduled; at the same time, the response credit is accumulated for the queue. In this way, queues are uniformly scheduled and a frequency of scheduling each queue is determined according to the predefined weight ratio. However, the response credits need to be compared with each other during selection of the to-be-scheduled queue, and to prevent the accumulated response credit from overflowing, all the response credits need to be cut down periodically and uniformly, resulting in a large amount of comparison and subtraction computations performed by the scheduling device; however, because the computing capability of the scheduling device is limited, a large number of input queues cannot be processed at the same time, and the complex operation greatly reduces the rate of sending the data packets and limits output bandwidth.

In order to process a large number of input queues at the same time and increase the rate of sending the data packets, in the prior art, another queue scheduling method is provided, which adopts a modified deficit round robin (MDRR). The method is specifically as follows: taking turns to give a scheduling opportunity to each queue participating in the scheduling; after one queue is scheduled once, scheduling a next adjacent queue; and performing a round robin in the same manner. Such a round robin manner does not need complex comparison and subtraction operations, thereby increasing the rate of scheduling and sending the data packets; moreover, a scheduler is able to support a large number of input queues without needing a strong computing capability. However, in this round robin manner, one queue is merely scheduled once, and the next queue is not scheduled until the queue sends all data allowed to be sent. The queue with a large weight is allowed to send a large amount of data in a single scheduling process. When the weights differ a lot between queues, and when it is a turn of a queue with a large weight to send service data, the data amount allowed to be sent is large, and a queue with a small weight is put aside for a long time; while a queue with a small weight is allowed to send a small amount of data in a single scheduling process, so other queues merely need to wait for a short time; as a result, queues cannot uniformly send the service data.

In the process of implementing the above queue scheduling, the inventors find that the prior art at least has the following problem: queues can uniformly send the service data through the WFQ, but the comparison between the response credits makes the operation complex, which results in that a large number of input queues cannot be processed. The MDRR can support a large number of input queues, but when queues are scheduled, the amounts of data allowed to be sent differ a lot, which results in that queues cannot uniformly send the service data.

SUMMARY OF THE INVENTION

Embodiments of the present invention provide a queue scheduling method and apparatus, which can not only implement scheduling of a large number of queues, but also can ensure that queues uniformly send service data.

In order to achieve the foregoing objectives, the embodiments of the present invention adopt the following technical solutions.

In one embodiment, a queue scheduling method includes determining whether service data exists in each to-be-scheduled data queue, and determining whether the to-be-scheduled data queues are allowed to send data. If it is determined that the service data exists in the to-be-scheduled data queues and the to-be-scheduled data queues are allowed to send data, placing queue marks of the to-be-scheduled data queues into a mark queue. The method further includes scheduling the queue marks of the to-be-scheduled data queues from the mark queue in sequence, and scheduling the to-be-scheduled data queues corresponding to the queue marks according to the queue marks. The to-be-scheduled data queues corresponding to the queue marks is enabled to send service data not exceeding predetermined data amounts.

In another embodiment, a queue scheduling apparatus includes a determination unit configured to determine whether service data exists in each to-be-scheduled data queue, and determine whether the to-be-scheduled data queues are allowed to send data. An enqueuing unit is configured to, when the determination unit determines that the service data exists in the to-be-scheduled data queues and the to-be-scheduled data queues are allowed to send data, place queue marks of the to-be-scheduled data queues into a mark queue. A sending unit is configured to schedule the queue marks of the to-be-scheduled data queues from the mark queue in sequence, schedule the to-be-scheduled data queues corresponding to the queue marks according to the queue marks, and enable the to-be-scheduled data queues corresponding to the queue marks to send service data not exceeding predetermined data amounts.

In the queue scheduling method and apparatus provided by the embodiments of the present invention, queue scheduling is implemented by determining whether each queue is allowed to send data, without needing complex comparison operations between queues; in this way, a scheduler does not need to have a high operational capability, and the scheduling of a large number of queues can be implemented. In addition, each of the data queues scheduled in sequence according to the queue marks in the mark queue sends a certain data amount each time, a scheduled data queue is put aside after sending the service data with a predetermined data amount, and it is the turn of a to-be-scheduled data queue corresponding to a next queue mark in the mark queue to send the service data with a predetermined data amount. In this manner, the to-be-scheduled data queues corresponding to the queue marks in the mark queue are scheduled in sequence, so that service data of the queues can be uniformly sent.

BRIEF DESCRIPTION OF THE DRAWINGS

To illustrate the technical solutions according to the embodiments of the present invention or in the prior art more clearly, the accompanying drawings required for describing the embodiments or the prior art are introduced below briefly. Apparently, the accompanying drawings in the following descriptions merely show some of the embodiments of the present invention, and persons of ordinary skill in the art can obtain other drawings according to the accompanying drawings without creative efforts.

DETAILED DESCRIPTION OF ILLUSTRATIVE EMBODIMENTS

The technical solutions of the embodiments of the present invention are clearly described in the following with reference to the accompanying drawings. It is obvious that the embodiments to be described are only a part rather than all of the embodiments of the present invention. All other embodiments obtained by persons of ordinary skill in the art based on the embodiments of the present invention without creative efforts shall fall within the protection scope of the present invention.

Embodiment 1

Figure 1:
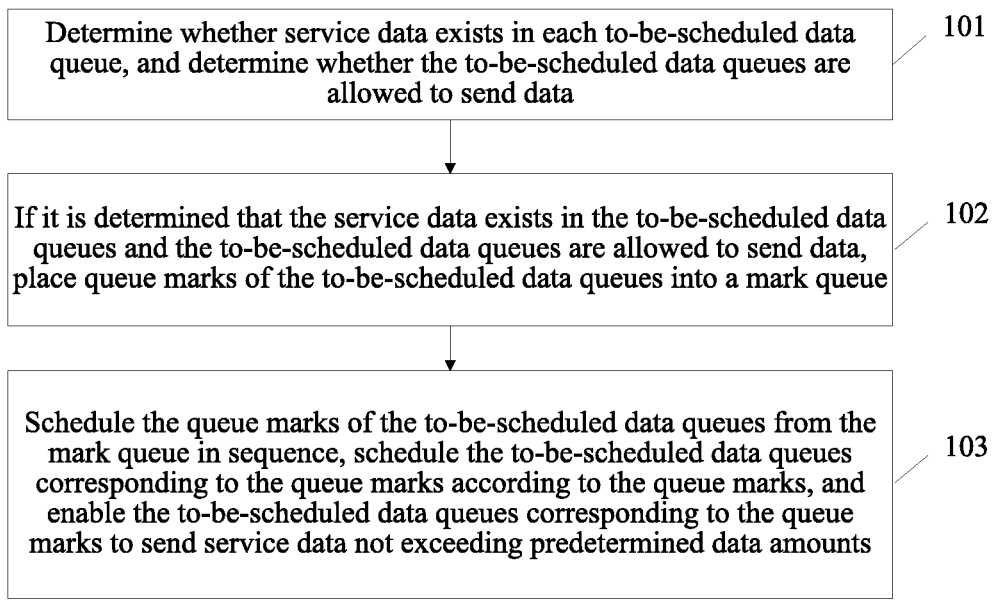
FIG. 1 is a flow chart of a method according to Embodiment 1 of the present invention.

The embodiment of the present invention provides a queue scheduling method. As shown in FIG. 1, the method includes the following steps.

101: Determine whether service data exists in each to-be-scheduled data queue, and determine whether the to-be-scheduled data queues are allowed to send data.

Determining whether service data exists in a to-be-scheduled data queue and determining whether the to-be-scheduled data queue is allowed to send data are two conditions under which the to-be-scheduled data queue meets a scheduling requirement. Each time the data amount allowed to be sent by the to-be-scheduled data queue is updated, or each time the to-be-scheduled data queue receives new service data, determination is performed, and the queue can be scheduled only when the two conditions are satisfied at the same time. On the contrary, when any one of the conditions is not satisfied, it is considered that a scheduling condition is not satisfied, so a queue that does not satisfy the scheduling condition is put aside.

If the data amounts allowed to be sent by the to-be-scheduled data queues are nonnegative numbers, it is determined that the to-be-scheduled data queues are allowed to send data; if the data amounts allowed to be sent by the to-be-scheduled data queues are not nonnegative numbers, it is determined that the to-be-scheduled data queues are not allowed to send data.

102: If it is determined that the service data exists in the to-be-scheduled data queues and the to-be-scheduled data queues are allowed to send data, place queue marks of the to-be-scheduled data queues into a mark queue.

The mark queue is formed by the queue marks of to-be-scheduled data queues satisfying scheduling conditions. According to an attribute of a queue, a queue mark is placed into the mark queue from a queue tail. At this time, the to-be-scheduled data queue does not send service data, and only a queue corresponding to a queue mark that lies in a head of the mark queue can send data. In addition, multiple mark queues may exist in one scheduler. Specifically, to-be-scheduled data queues may be grouped, and each group is corresponding to a mark queue. Enqueuing and dequeuing of queue marks are processed at the same time through the multiple mark queues, which may increase the processing speed of the scheduler. It should be noted that, scheduling of each mark queue may adopt a round robin, a strict priority, or another rule, and a scheduling manner for each mark queue is not limited in the embodiment of the present invention.

103: Schedule the queue marks of the to-be-scheduled data queues from the mark queue in sequence, schedule the to-be-scheduled data queues corresponding to the queue marks according to the queue marks, and enable the to-be-scheduled data queues corresponding to the queue marks to send service data not exceeding predetermined data amounts.

According to an attribute of the mark queue, scheduling queue marks from the mark queue starts from the head of the queue and proceeds backward in sequence. The mark queue may be implemented by adopting a form of a single linked list or a multiple linked lists, and each mark queue at least has a queue head, a queue tail, and an identifier for indicating whether the mark queue is empty, so that the to-be-scheduled data queues send service data to data receiving queues in sequence.

In addition, to ensure the uniformity of the service data, the scheduled data queues can only send service data not exceeding the predetermined data amounts. That is to say, it is stipulated that each queue sends a same data amount when being scheduled once, but data amounts actually sent may be different. It should be noted that, determining whether the sent service data amount reaches the predetermined data amount is implemented at the time when the sending of each complete data packet is completed, and the sending of the data packet is not interrupted at a midway immediately when the predetermined data amount is reached, thereby ensuring data integrity. The predetermined data amount may be set to be very small, so that the scheduled queue can rapidly complete the sending of the service data; in this way, the to-be-scheduled data queues in the mark queue take turns to send service data, and no queue is put aside for a long time due to a non-uniform data amount sent by each queue. It should be noted that, when the data amount of the service data in a scheduled data queue is less than the predetermined data amount, the scheduled data queue ends the sending of the data this time after sending all service data, and it is the turn of a to-be-scheduled data queue corresponding to a next queue mark in the mark queue to send service data.

In the queue scheduling method provided by the embodiment of the present invention, the queue scheduling is implemented by determining whether each queue is allowed to send data, without needing complex comparison operations between queues; in this way, the scheduler does not need to have a high operational capability, and the scheduling of a large number of queues can be implemented.

In addition, each of the data queues scheduled in sequence according to the queue marks in the mark queue sends a certain data amount each time, the scheduled data queue is put aside after sending the service data with a predetermined data amount, and it is the turn of a to-be-scheduled data queue corresponding to a next queue mark in the mark queue to send service data with a predetermined data amount. In this manner, the to-be-scheduled data queues corresponding to the queue marks in the mark queue are scheduled in sequence, so that service data of queues can be uniformly sent.

Embodiment 2

Figure 2:
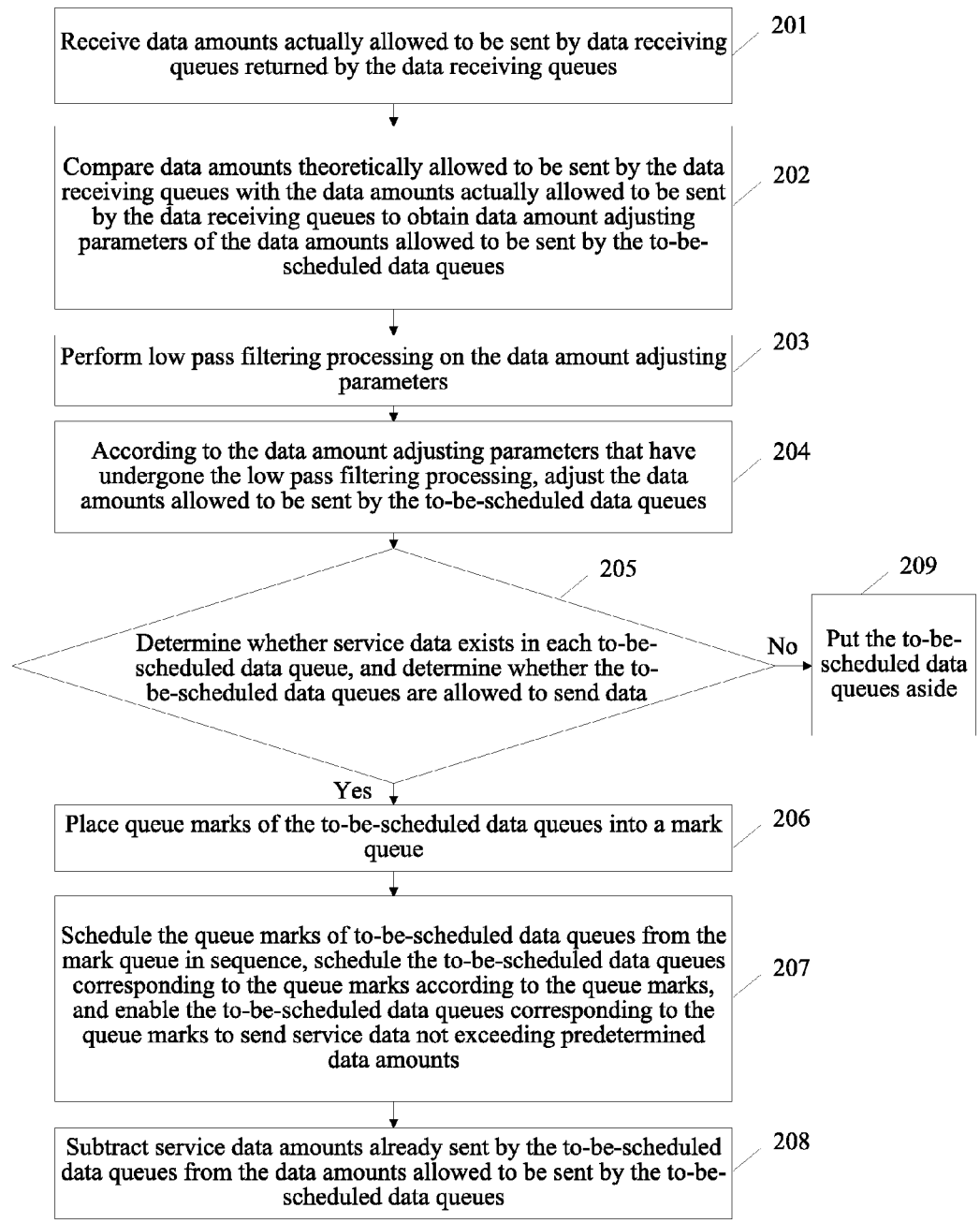
FIG. 2 is a flow chart of a method according to Embodiment 2 of the present invention.

The embodiment of the present invention provides a queue scheduling method. As shown in FIG. 2, the method includes the following steps.

201: Receive data amounts actually allowed to be sent by data receiving queues returned by the data receiving queues.

The data receiving queues are data output queues in a current-level scheduler, and is also data input queues in a next-level scheduler, namely, to-be-scheduled data queues in the next-level scheduler. Same as a to-be-scheduled data queue in the current-level scheduler, a to-be-scheduled data queue in the next-level scheduler also has a data amount allowed to be sent by the to-be-scheduled data queue in the next-level scheduler, and the data amount varies with the sending of the data in real time, the data amount is for determining whether the to-be-scheduled data queue in the next-level scheduler is allowed to send data. For the current-level scheduler, the to-be-scheduled data queue in the next-level scheduler is the data receiving queue. Therefore, the data amount actually allowed to be sent by the data receiving queue is reversely sent to the current-level scheduler, so that the current-level scheduler controls the data traffic of the current-level scheduler after receiving the data amount that is actually allowed to be sent by the data receiving queue.

202: Compare data amounts theoretically allowed to be sent by the data receiving queues with the data amounts actually allowed to be sent by the data receiving queues to obtain data amount adjusting parameters of the data amounts allowed to be sent by the to-be-scheduled data queues.

A data amount theoretically allowed to be sent by the data receiving queue is a predefined system parameter in a stage of system setting, resetting, or programming, and may be an empirical value obtained through sample data training, and is used for setting a theoretical value for the data amount actually allowed to be sent by the data receiving queue. When an actual value fluctuates near the theoretical value, it indicates that a network lies in a reasonable congestion degree. When the data amount actually allowed to be sent by the data receiving queue is higher than the data amount theoretically allowed to be sent by the data receiving queue, it indicates that the network lies in a relatively idle state; when the data amount actually allowed to be sent by the data receiving queue is lower than the data amount theoretically allowed to be sent by the data receiving queue, it indicates that the network lies in a relatively congested state. Therefore, by comparing the actual value with the theoretical value, for example, obtaining the difference between the two values, the obtained data amount adjusting parameter may represent the usage of transmission bandwidth, so as to adjust data amount allowed to be sent by each to-be-scheduled data queue.

203: Perform low pass filtering processing on the data amount adjusting parameters.

A data amount actually allowed to be sent by the receiving queue varies at the time when data is sent, so a data amount adjusting parameter obtained by comparing the data amount actually allowed to be sent by the receiving queue and a data amount theoretically allowed to be sent by the receiving queue also varies at any time. However, the instantaneous substantial change of the data amount adjusting parameter cannot represent the overall usage of output bandwidth, so the low pass filtering processing needs to be performed on the data amount adjusting parameter to obtain the filtered data amount adjusting parameter, so that a scheduler adjusts, according to the data amount adjusting parameter that has undergone low pass filtering processing, the data amount allowed to be sent by the to-be-scheduled data queue.

A low pass filter may be in a form of finite impulse response (FIR), infinite impulse response (IIR), or the like. For example, a low pass filtering module is formed by an IIR filter and a saturation limiter, instantaneously mutating clutters are taken out after the data amount adjusting parameter passes through the low pass filter, and then an amplitude value of the data amount adjusting parameter is limited within an interval [0, 1] through the saturation limiter.

204: According to the data amount adjusting parameters that have undergone the low pass filtering processing, adjust the data amounts allowed to be sent by the to-be-scheduled data queues.

The specific step of adjusting the data amounts allowed to be sent by the to-be-scheduled data queues is as follows: perform calculation according to committed information rates (CIR) and peak information rates (PIR) of the to-be-scheduled data queue, and the data amount adjusting parameters, to obtain data amount increased values of the data amounts allowed to be sent by the to-be-scheduled data queues; and adding the data amounts allowed to be sent by the to-be-scheduled data queues to the data amount increased values, to obtain adjusted data amounts allowed to be sent by the to-be-scheduled data queues. A data amount allowed to be sent by a to-be-scheduled data queue is reversely adjusted according to usage of the output bandwidth of the scheduler; a data amount allowed to be sent by a to-be-scheduled data queue that is corresponding to a to-be-scheduled data queue with a large weight ratio increases rapidly, while a data amount allowed to be sent by the to-be-scheduled data queue that is corresponding to a to-be-scheduled data queue with a small weight ratio increases slowly, thereby controlling sending bandwidth of each input queue of the scheduler.

A data amount increased value may be obtained by calculating through a predefined adjustment function. For example, the predefined adjustment function may include a predefined CIR, a predefined PIR, and a data amount adjusting parameter K that has undergone filtering processing. For example, the adjustment function may be BW=CIR+(PIR−CIR)×K. BW obtained through calculation represents the sending bandwidth that should be allocated to the to-be-scheduled data queue to send data, so it is obtained that the data amount increased value, that should be increased per second, of the data amount allowed to be sent by the to-be-scheduled data queue is BW bytes. It should be noted that, according to a priority and a weight ratio of each to-be-scheduled data queue, different CIRs, PIRs and adjustment functions may be predefined; to-be-scheduled data queues may be divided into several priority groups, or a weight of each to-be-scheduled data queue is separately managed, so as to implement flexible allocation of output bandwidth.

205: Determine whether service data exists in each to-be-scheduled data queue, and determine whether the to-be-scheduled data queues are allowed to send data; when it is determined that the service data exists in the to-be-scheduled data queues and that the to-be-scheduled data queues are allowed to send data, step 206 is executed; when any one of the two conditions is not satisfied, step 209 is executed.

Determining whether service data exists in a to-be-scheduled data queue and determining whether the to-be-scheduled data queue is allowed to send data are two conditions under which the to-be-scheduled data queue meets a scheduling requirement. Each time the data amount allowed to be sent by the to-be-scheduled data queue is updated, or each time the to-be-scheduled data queue receives new service data, determination is performed, and the queue can be scheduled only when the two conditions are satisfied at the same time. On the contrary, when any one of the conditions is not satisfied, it is considered that a scheduling condition is not satisfied, so a queue that does not satisfy the scheduling condition is put aside.

If the data amounts allowed to be sent by the to-be-scheduled data queues are nonnegative numbers, it is determined that the to-be-scheduled data queues are allowed to send data; if the data amounts allowed to be sent by the to-be-scheduled data queues are not nonnegative numbers, it is determined that the to-be-scheduled data queues are not allowed to send data.

206: Place queue marks of the to-be-scheduled data queues into a mark queue.

The mark queue is formed by the queue marks of the to-be-scheduled data queues satisfying scheduling conditions. According to an attribute of a queue, a queue mark is placed into the mark queue from a queue tail. At this time, the to-be-scheduled data queue does not send service data, and only a queue corresponding to a queue mark that lies in a head of the mark queue can send data.

207: Schedule the queue marks of to-be-scheduled data queues from the mark queue in sequence, schedule the to-be-scheduled data queues corresponding to the queue marks according to the queue marks, and enable the to-be-scheduled data queues corresponding to the queue marks to send service data not exceeding predetermined data amounts.

According to an attribute of the mark queue, scheduling queue marks from the mark queue starts from the head of the queue and proceeds backward in sequence. The mark queue may be implemented by adopting a form of a single linked list or a multiple linked list, and each mark queue at least has a queue head, a queue tail, and an identifier for indicating whether the mark queue is empty, so that the to-be-scheduled data queues send service data to data receiving queues in sequence. In addition, multiple mark queues may exist in one scheduler. Specifically, to-be-scheduled data queues may be grouped, and each group is corresponding to a mark queue. Enqueuing and dequeuing of queue marks are processed at the same time through the multiple mark queues, which may increase the processing speed of the scheduler. It should be noted that, scheduling of each mark queue may adopt a round robin, a strict priority, or another rule, and a scheduling manner for each mark queue is not limited in the embodiment of the present invention.

In addition, to ensure the uniformity of the service data, the scheduled data queues can only send service data not exceeding the predetermined data amounts. That is to say, it is stipulated that each queue sends a same data amount when being scheduled once, but data amounts actually sent may be different. It should be noted that, determining whether the sent service data amount reaches the predetermined data amount is implemented at the time when the sending of each complete data packet is completed, and the sending of the data packet is not interrupted at a midway immediately when the predetermined data amount is reached, thereby ensuring data integrity. The predetermined data amount may be set to be very small, so that the scheduled queue can rapidly complete the sending of the service data; in this way, the to-be-scheduled data queues in the mark queue take turns to send the service data, and no queue is put aside for a long time due to a non-uniform data amount sent by each queue. It should be noted that, when the data amount of the service data in a scheduled data queue is less than the predetermined data amount, the scheduled data queue ends the sending of the data this time after sending all service data, and it is the turn of a to-be-scheduled data queue corresponding to a next queue mark in the mark queue to send the service data. For example, it is stipulated that a to-be-scheduled data queue corresponding to a queue mark at a queue head sends service data not exceeding 1000 bytes, and when the total service data in the to-be-scheduled data queue corresponding to the queue mark only is 500 bytes, the queue mark exits from the mark queue after the sending of the 500-byte service data is completed. When the total service data in the to-be-scheduled data queue corresponding to the queue mark is 3000 bytes, the data is sent as a complete data packet. Assuming that the length of a data packet is 600 bytes, the queue may send two complete data packets this time. At this time, if it is determined that the data amount allowed to be sent by the queue is nonnegative, and that there is data to be sent, the queue mark corresponding to the queue is re-added to the tail of the mark queue.

208: Subtract service data amounts already sent by the to-be-scheduled data queues from the data amounts allowed to be sent by the to-be-scheduled data queues.

Each to-be-scheduled data queue is corresponding to a dynamically adjustable shaper, and the shaper stores a predefined adjustment function, which includes configuration of PIR and CIR, a data amount allowed to be sent by a to-be-scheduled data queue, and an upper limit value of the data amount allowed to be sent by the to-be-scheduled data queue. The shaper receives a data amount adjusting parameter k, substitutes the received data amount adjusting parameter k, that dynamically changes, into the adjustment function, and obtains, through calculation, an increased value of the data amount allowed to be sent by the to-be-scheduled data queue, so as to increase the data amount allowed to be sent by the to-be-scheduled data queue, thereby adjusting sending bandwidth of each queue. Meanwhile, once the to-be-scheduled data queue is scheduled, and after the service data is sent, the data amount that is allowed to be sent by the to-be-scheduled data queue corresponding to the scheduled data queue is decreased by a decreased value, where the decreased value of the data amount allowed to be sent by the to-be-scheduled data queue is a data amount already sent by the scheduled data queue. The upper limit value of the data amount allowed to be sent by the to-be-scheduled data queue is used to prevent the data amount allowed to be sent by the to-be-scheduled data queue from overflowing, and if the data amount allowed to be sent by the to-be-scheduled data queue reaches the upper limit value, the increasing is stopped.

In addition, the shaper of a current-level scheduler further allows the data amount sent by the to-be-scheduled data queue to be reversely sent to a previous-level scheduler, and the data amount serves as the basis for the previous-level scheduler to determine whether output bandwidth is congested.

209: Put the to-be-scheduled data queues aside.

In step 208, each time after the to-be-scheduled data queues send the service data, the already sent data amounts need to be subtracted from the data amounts allowed to be sent by the to-be-scheduled data queues. At this time, the data amounts allowed to be sent by the to-be-scheduled data queues may change into negative numbers, and the scheduler no longer allows the to-be-scheduled data queues to send data, so the to-be-scheduled data queues are put aside. If network congestion occurs or a weight ratio of the to-be-scheduled data queue is small, increased values of the data amounts allowed to be sent by the to-be-scheduled data queues are small, and the data amounts allowed to be sent by the to-be-scheduled data queues gradually increase when the to-be-scheduled data queue are put aside; the to-be-scheduled data queues are not allowed to send data until the data amounts allowed to be sent by the to-be-scheduled data queues change into nonnegative numbers again.

In the queue scheduling method provided by the embodiment of the present invention, the queue scheduling is implemented by determining whether each queue is allowed to send data, without needing complex comparison operations between queues; in this way, the scheduler does not need to have a high operational capability, and the scheduling of a large number of queues can be implemented.

In addition, each of the data queues scheduled in sequence according to the queue marks in the mark queue send a certain data amount each time, the scheduled data queue is put aside after sending the service data with a predetermined data amount, and it is the turn of a to-be-scheduled data queue corresponding to a next queue mark in the mark queue to send service data with a predetermined data amount. In this manner, the to-be-scheduled data queues corresponding to the queue marks in the mark queue are scheduled in sequence, so that service data of the queues can be uniformly sent.

Embodiment 3

Figure 3:
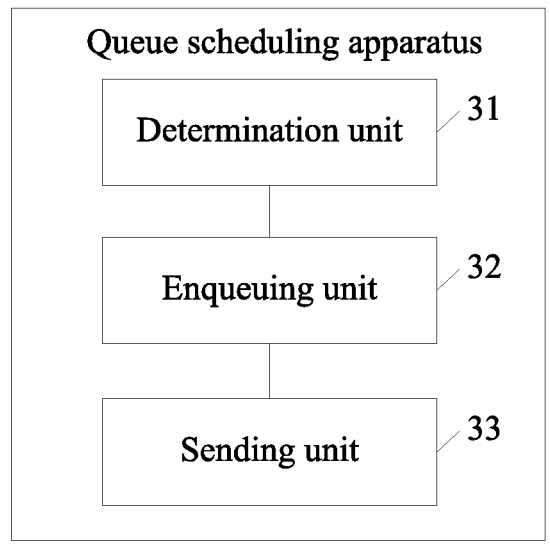
FIG. 3 is a schematic composition diagram of an apparatus according to Embodiment 3 of the present invention.

The embodiment of the present invention provides a queue scheduling apparatus, as shown in FIG. 3, including: a determination unit 31, an enqueuing unit 32, and a sending unit 33.

The determination unit 31 is configured to determine whether service data exists in each to-be-scheduled data queue, and determine whether the to-be-scheduled data queues are allowed to send data.

Determining whether service data exists in a to-be-scheduled data queue and determining whether the to-be-scheduled data queue is allowed to send data are two conditions under which the to-be-scheduled data queue meets a scheduling requirement. The queue can be scheduled only when the two conditions are satisfied at the same time. On the contrary, when any one of the conditions is not satisfied, it is considered that a scheduling condition is not satisfied, so a queue that does not satisfy the scheduling condition is put aside.

If the data amounts allowed to be sent by the to-be-scheduled data queues are nonnegative numbers, it is determined that the to-be-scheduled data queues are allowed to send data; if the data amounts allowed to be sent by the to-be-scheduled data queues are not nonnegative numbers, it is determined that the to-be-scheduled data queues are not allowed to send data.

The enqueuing unit 32 is configured to, when the determination unit 31 determines that the service data exists in the to-be-scheduled data queues and the to-be-scheduled data queues are allowed to send data, place queue marks of the to-be-scheduled data queues into a mark queue.

The mark queue is formed by the queue marks of to-be-scheduled data queues satisfying scheduling conditions. According to an attribute of a queue, a queue mark is placed into the mark queue from a queue tail. At this time, the to-be-scheduled data queue does not send service data, and only a queue corresponding to a queue mark that lies in a head of the mark queue can send data.

The sending unit 33 is configured to schedule the queue marks of the to-be-scheduled data queues from the mark queue in sequence, schedule the to-be-scheduled data queues corresponding to the queue marks according to the queue marks, and enable the to-be-scheduled data queues corresponding to the queue marks to send service data not exceeding predetermined data amounts.

According to an attribute of the mark queue, scheduling queue marks from the mark queue starts from the head of the queue and proceeds backward in sequence. The mark queue may be implemented by adopting a form of a single linked list or a multiple linked list, and each mark queue at least has a queue head, a queue tail, and an identifier for indicating whether the mark queue is empty, so that the to-be-scheduled data queues send service data to data receiving queues in sequence.

In addition, to ensure the uniformity of the service data, the scheduled data queues can only send service data not exceeding the predetermined data amounts. That is to say, it is stipulated that each queue sends a same data amount when being scheduled once, but data amounts actually sent may be different. It should be noted that, determining whether the sent service data amount reaches the predetermined data amount is implemented at the time when the sending of each complete data packet is completed, and the sending of the data packet is not interrupted at a midway immediately when the predetermined data amount is reached, thereby ensuring data integrity. The predetermined data amount may be set to be very small, so that the scheduled queue can rapidly complete the sending of the service data; in this way, the to-be-scheduled data queues in the mark queue take turns to send service data, and no queue is put aside for a long time due to a non-uniform data amount sent by each queue. It should be noted that, when the data amount of the service data in a scheduled data queue is less than the predetermined data amount, the scheduled data queue ends the sending of the data this time after sending all service data, and it is the turn of a to-be-scheduled data queue corresponding to a next queue mark in the mark queue to send service data. For example, it is stipulated that a to-be-scheduled data queue corresponding to a queue mark at a queue head sends service data not exceeding 1000 bytes, and when the total service data in the to-be-scheduled data queue corresponding to the queue mark only is 500 bytes, the queue mark exits from the mark queue after the sending of the 500-byte service data is completed. When the total service data in the to-be-scheduled data queue corresponding to the queue mark is 3000 bytes, the data is sent as a complete data packet. Assuming that the length of a data packet is 600 bytes, the queue may send two complete data packets this time. At this time, if it is determined that the data amount allowed to be sent by the queue is nonnegative, and that there is data to be sent, the queue mark corresponding to the queue is re-added to the tail of the mark queue.

Figure 4:
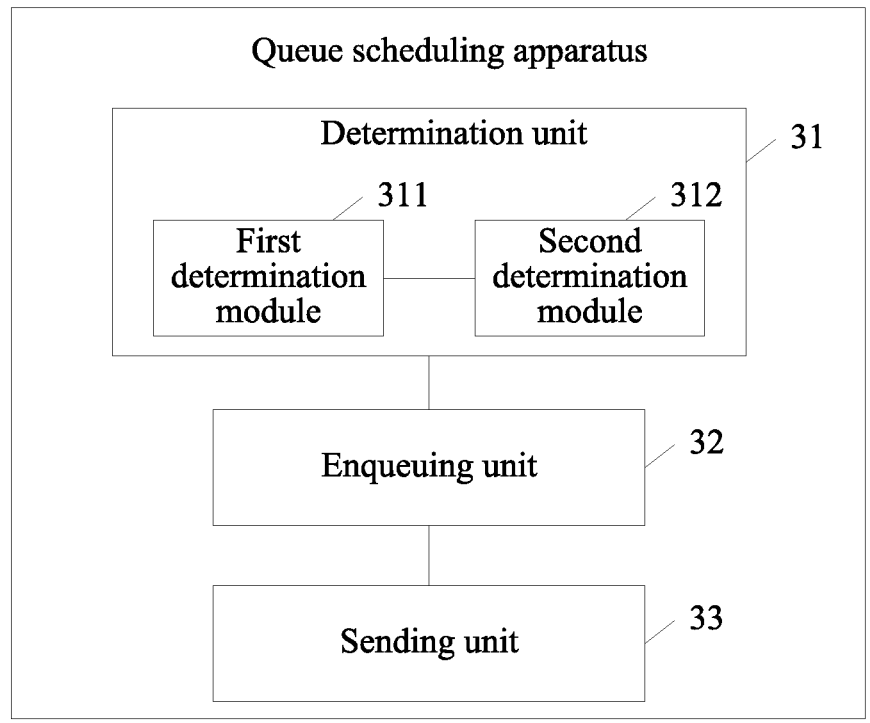
FIG. 4 is a schematic composition diagram of another apparatus according to Embodiment 3 of the present invention.

Furthermore, as shown in FIG. 4, the determination unit 31 includes a first determination module 311 configured to determine whether data amounts allowed to be sent by the to-be-scheduled data queues are nonnegative numbers. A second determination module 312 is configured to, when the first determination module 311 determines that the data amounts allowed to be sent by the to-be-scheduled data queues are nonnegative numbers, determine that the to-be-scheduled data queues are allowed to send data. The second determination module 312 is further configured to, when the first determination module 311 determines that the data amounts allowed to be sent by the to-be-scheduled data queues are not nonnegative numbers, determine that the to-be-scheduled data queues are not allowed to send data.

Figure 5:
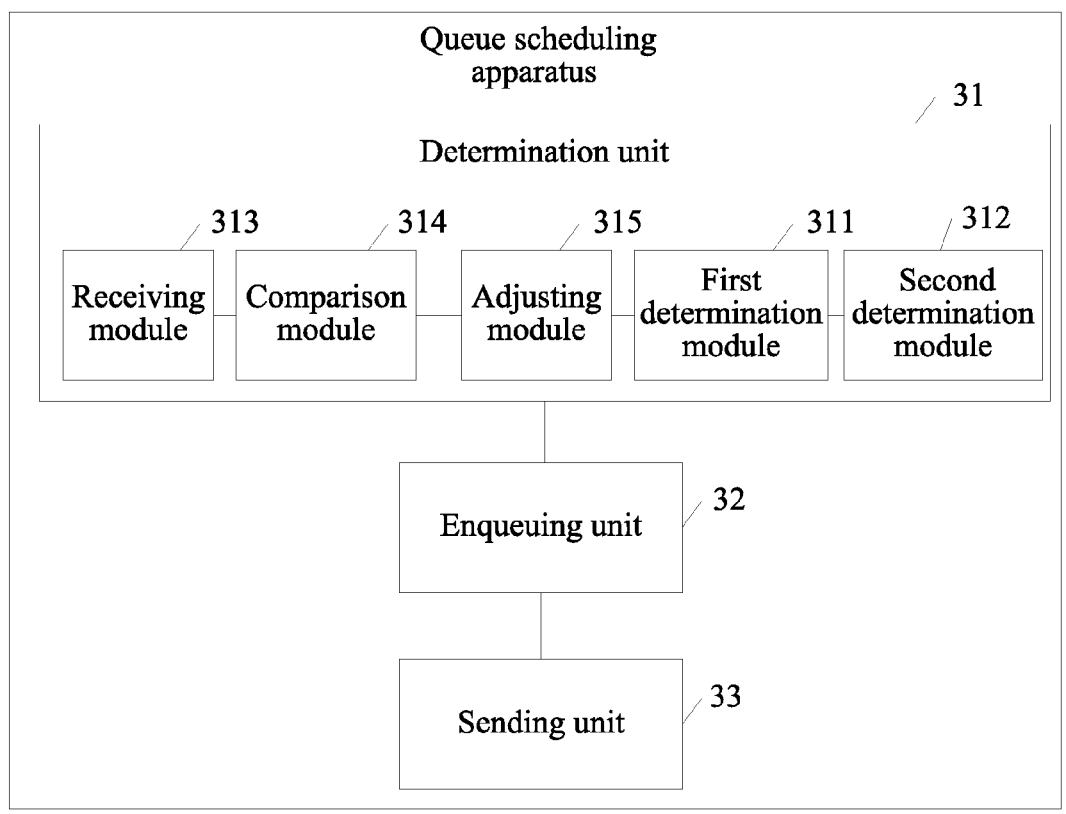
FIG. 5 is a schematic composition diagram of another apparatus according to Embodiment 3 of the present invention.

Furthermore, as shown in FIG. 5, the determination unit 31 further includes the following modules.

A receiving module 313 is configured to, before the first determination module 311 determines whether the data amounts allowed to be sent by the to-be-scheduled data queues are nonnegative numbers, receive data amounts actually allowed to be sent by data receiving queues returned by the data receiving queues.

The data receiving queues are data output queues in a current-level scheduler, and is also data input queues in a next-level scheduler, namely, to-be-scheduled data queues in the next-level scheduler. Same as a to-be-scheduled data queue in the current-level scheduler, a to-be-scheduled data queue in the next-level scheduler also has a data amount allowed to be sent by the to-be-scheduled data queue in the next-level scheduler, and the data amount varies with the sending of the data in real time, the data amount is for determining whether the to-be-scheduled data queue in the next-level scheduler is allowed to send data. For the current-level scheduler, the to-be-scheduled data queue in the next-level scheduler is the data receiving queue. Therefore, the data amount actually allowed to be sent by the data receiving queue is reversely sent to the current-level scheduler, so that the current-level scheduler controls the data traffic of the current-level scheduler after receiving the data amount that is actually allowed to be sent by the data receiving queue.

A comparison module 314 is configured to compare data amounts theoretically allowed to be sent by the data receiving queues with the data amounts actually allowed to be sent by the data receiving queues to obtain data amount adjusting parameters of the data amounts allowed to be sent by the to-be-scheduled data queues.

A data amount theoretically allowed to be sent by the data receiving queue is a predefined system parameter in a stage of system setting, resetting, or programming, and may be an empirical value obtained through sample data training, and is used for setting a theoretical value for the data amount actually allowed to be sent by the data receiving queue. When an actual value fluctuates near the theoretical value, it indicates that a network lies in a reasonable congestion degree. When the data amount actually allowed to be sent by the data receiving queue is higher than the data amount theoretically allowed to be sent by the data receiving queue, it indicates that the network lies in a relatively idle state; when the data amount actually allowed to be sent by the data receiving queue is lower than the data amount theoretically allowed to be sent by the data receiving queue, it indicates that the network lies in a relatively congested state. Therefore, by comparing the actual value with the theoretical value, for example, obtaining the difference between the two values, the obtained data amount adjusting parameter may represent the usage of transmission bandwidth, so as to adjust data amount allowed to be sent by each to-be-scheduled data queue.

An adjusting module 315 is configured to adjust, according to the data amount adjusting parameters, the data amounts allowed to be sent by the to-be-scheduled data queues.

Figure 6:
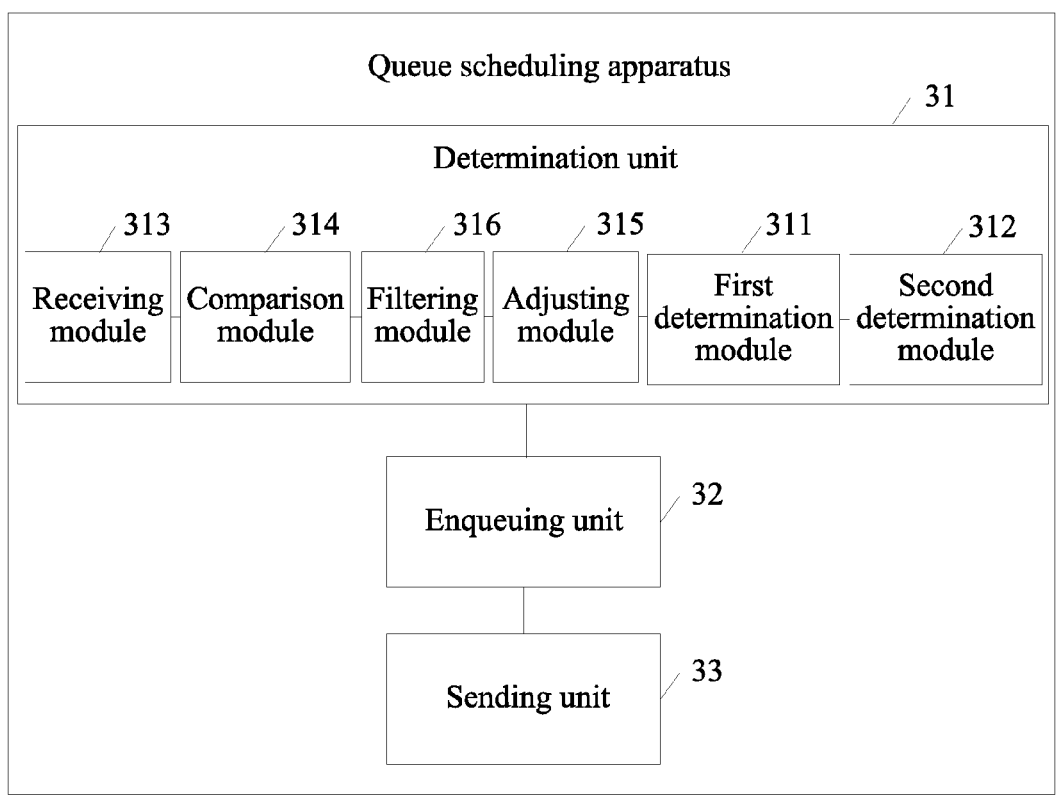
FIG. 6 is a schematic composition diagram of another apparatus according to Embodiment 3 of the present invention.

Furthermore, as shown in FIG. 6, the determination unit 31 further includes a filtering module 316 configured to, after the comparison module 314 obtains the data amount adjusting parameters of the data amounts allowed to be sent by the to-be-scheduled data queues, perform low pass filtering processing on the data amount adjusting parameters.

A data amount actually allowed to be sent by the receiving queue varies at the time when data is sent, so a data amount adjusting parameter obtained by comparing the data amount actually allowed to be sent by the receiving queue and a data amount theoretically allowed to be sent by the receiving queue also varies at any time. However, the instantaneous substantial change of the data amount adjusting parameter cannot represent the overall usage of output bandwidth, so the low pass filtering processing needs to be performed on the data amount adjusting parameter to obtain the filtered data amount adjusting parameter, so that a scheduler adjusts, according to the data amount adjusting parameter that has undergone low pass filtering processing, the data amount allowed to be sent by the to-be-scheduled data queue.

A low pass filter may be in a form of finite impulse response (FIR), infinite impulse response (IIR), or the like. For example, a low pass filtering module is formed by an IIR filter and a saturation limiter, instantaneously mutating clutters are taken out after the data amount adjusting parameter passes through the low pass filter, and then an amplitude value of the data amount adjusting parameter is limited within an interval [0, 1] through the saturation limiter.

The adjusting module 315 is further configured to, according to the data amount adjusting parameters that have undergone the low pass filtering processing, adjust the data amounts allowed to be sent by the to-be-scheduled data queues.

The adjusting module 315 is further configured to perform calculation according to committed information rates (OR) and peak information rates (PIR) of the to-be-scheduled data queues, and the data amount adjusting parameters, to obtain data amount increased values of the data amounts allowed to be sent by the to-be-scheduled data queues; and add the data amounts allowed to be sent by the to-be-scheduled data queues to the data amount increased value, to obtain adjusted data amounts allowed to be sent by the to-be-scheduled data queues. A data amount allowed to be sent by a to-be-scheduled data queue is reversely adjusted according to usage of the output bandwidth of the scheduler; a data amount allowed to be sent by a to-be-scheduled data queue that is corresponding to a to-be-scheduled data queue with a large weight ratio increases rapidly, while a data amount allowed to be sent by the to-be-scheduled data queue that is corresponding to a to-be-scheduled data queue with a small weight ratio increases slowly, thereby controlling sending bandwidth of each input queue of the scheduler.

A data amount increased value may be obtained by calculating through a predefined adjustment function. For example, the predefined adjustment function may include a predefined CIR, a predefined PIR, and a data amount adjusting parameter K that has undergone filtering processing. For example, the adjustment function may be BW=CIR+(PIR−CIR)×K. BW obtained through calculation represents the sending bandwidth that should be allocated to the to-be-scheduled data queue to send data, so it is obtained that the data amount increased value, that should be increased per second, of the data amount allowed to be sent by the to-be-scheduled data queue is BW bytes. It should be noted that, according to a priority and a weight ratio of each to-be-scheduled data queue, different CIRs, PIRs and adjustment functions may be predefined; to-be-scheduled data queues may be divided into several priority groups, or a weight of each to-be-scheduled data queue is separately managed, so as to implement flexible allocation of output bandwidth.

Figure 7:
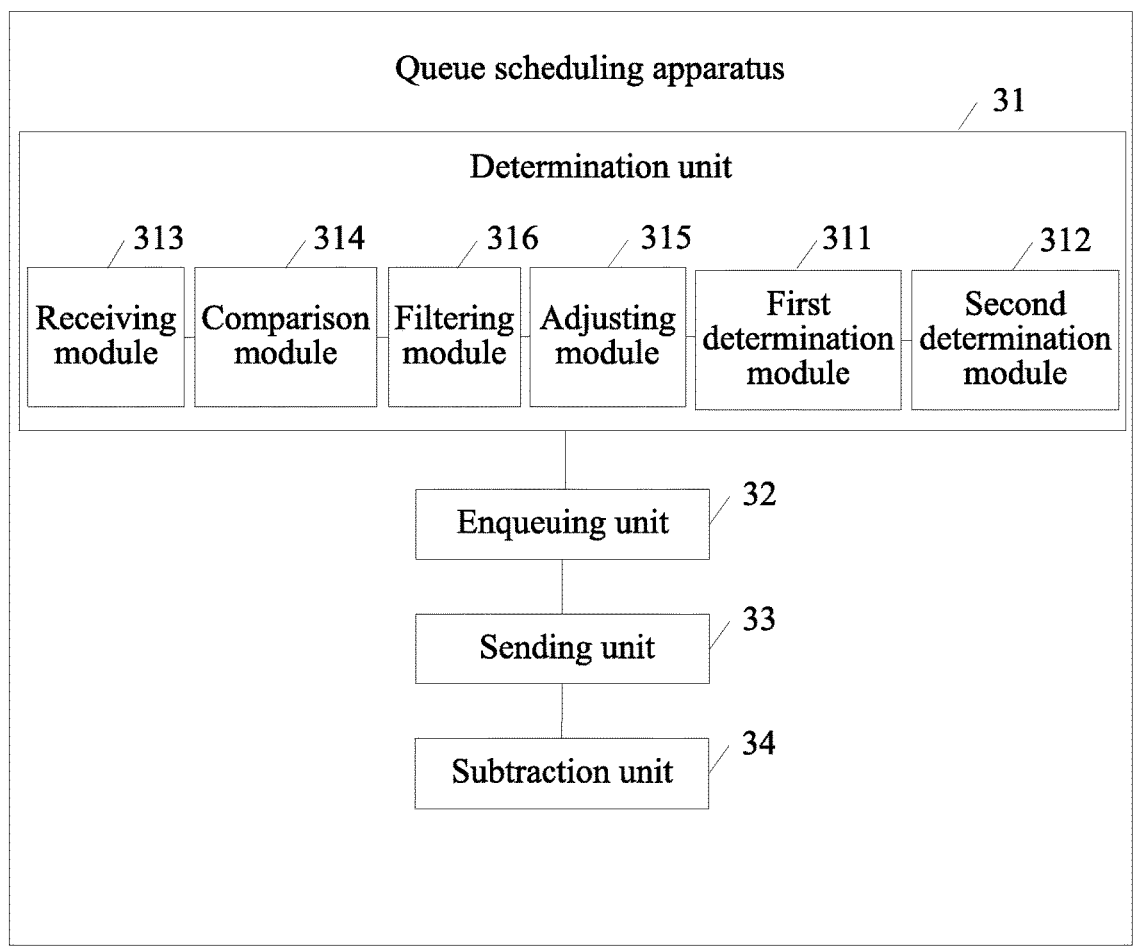
FIG. 7 is a schematic composition diagram of another apparatus according to Embodiment 3 of the present invention.

Furthermore, as shown in FIG. 7, the queue scheduling apparatus further includes a subtraction unit 34 configured to, after the sending unit 33 schedules the to-be-scheduled data queues corresponding to the queue marks according to the queue marks, and enables the to-be-scheduled data queues corresponding to the queue marks to send service data not exceeding the predetermined data amounts, subtract service data amounts already sent by the to-be-scheduled data queues from the data amounts allowed to be sent by the to-be-scheduled data queues.

Each to-be-scheduled data queue is corresponding to a dynamically adjustable shaper, and the shaper stores a predefined adjustment function, which includes configuration of PIR and CIR, a data amount allowed to be sent by a to-be-scheduled data queue, and an upper limit value of the data amount allowed to be sent by the to-be-scheduled data queue. The shaper receives a data amount adjusting parameter k, substitutes the received data amount adjusting parameter k, that dynamically changes, into the adjustment function, and obtains, through calculation, an increased value of the data amount allowed to be sent by the to-be-scheduled data queue, so as to increase the data amount allowed to be sent by the to-be-scheduled data queue, thereby adjusting sending bandwidth of each queue. Meanwhile, once the to-be-scheduled data queue is scheduled, and after the service data is sent, the data amount that is allowed to be sent by the to-be-scheduled data queue corresponding to the scheduled data queue is decreased by a decreased value, where the decreased value of the data amount allowed to be sent by the to-be-scheduled data queue is a data amount already sent by the scheduled data queue. The upper limit value of the data amount allowed to be sent by the to-be-scheduled data queue is used to prevent the data amount allowed to be sent by the to-be-scheduled data queue from overflowing, and if the data amount allowed to be sent by the to-be-scheduled data queue reaches the upper limit value, the increasing is stopped.

It should be noted that, reference may be made to the content in Embodiment 1 and Embodiment 2 for specific description of each functional module in the embodiment of the present invention, and details are not described again in the embodiment of the present invention.

In the queue scheduling apparatus provided by the embodiment of the present invention, the queue scheduling is implemented by determining whether each queue is allowed to send data, without needing complex comparison operations between queues; in this way, the scheduler does not need to have a high operational capability, and the scheduling of a large number of queues can be implemented.

In addition, each of the data queues scheduled in sequence according to the queue marks in the mark queue send a certain data amount each time, the scheduled data queue is put aside after sending the service data with a predetermined data amount, and it is the turn of a to-be-scheduled data queue corresponding to a next queue mark in the mark queue to send service data with a predetermined data amount. In this manner, the to-be-scheduled data queues corresponding to the queue marks in the mark queue are scheduled in sequence, so that service data of the queues can be uniformly sent.

Through the foregoing description of the embodiments, persons skilled in the art can clearly understand that the present invention may be implemented by software plus necessary universal hardware, and of course may also be implemented through hardware, but in most cases, the present invention is preferably implemented through the former method. Based on such understanding, the technical solutions of the present invention or the part that makes contributions to the prior art can be substantially embodied in the form of a software product. The computer software product is stored in a readable storage medium, for example, a floppy disk, a hard disk, or an optical disk of a computer, and contains several instructions used to instruct a computer device (for example, a personal computer, a server, or a network device) to perform the methods according to the embodiments of the present invention.

The foregoing description is merely about specific embodiments of the present invention, but is not intended to limit the protection scope of the present invention. Various variations or replacements made by persons skilled in the art within the technical scope of the present invention shall fall within the protection scope of the present invention. Therefore, the protection scope of the present invention is subject to the appended claims.

What is claimed is:

1. A queue scheduling method comprising:
    determining whether service data exists in each to-be-scheduled data queue;
    determining whether the each to-be-scheduled data queue is allowed to send data, wherein performing the determining whether service data exists in the each to-be-scheduled data queue as well as the determining whether the each to-be-scheduled data queue is allowed to send data are triggered
        when a data amount allowed to be sent by the each to-be-scheduled data queue is updated or
        when the each to-be-scheduled data queue receives new service data;
    determining that the service data exists in the each to-be-scheduled data queue and the each to-be-scheduled data queue is allowed to send data, and in response to the determining,
        placing queue marks of the each to-be-scheduled data queue into a mark queue; and
        scheduling the queue marks of the each to-be-scheduled data queue from the mark queue in sequence;
    scheduling the each to-be-scheduled data queue corresponding to the queue marks according to the queue marks;

enabling the each to-be-scheduled data queue corresponding to the queue marks to send service data not exceeding predetermined data amounts;

receiving data amounts actually allowed to be sent by data receiving queues returned by the data receiving queues; and comparing data amounts theoretically allowed to be sent by the data receiving queues with the data amounts actually allowed to be sent by the data receiving queues to obtain data amount adjusting parameters of the data amounts allowed to be sent by the each to-be-scheduled data queue, wherein the data amounts actually allowed to be sent are configured to vary with respect to the data amounts theoretically allowed to be sent, wherein the data amounts theoretically allowed to be sent are constant values, and the data amount adjusting parameters are based on the data amounts theoretically allowed to be sent and the data amounts actually allowed to be sent.

2. The queue scheduling method according to claim 1, wherein the determining whether the each to-be-scheduled data queue is allowed to send data comprises:

determining whether data amounts allowed to be sent by the each to-be-scheduled data queue are nonnegative numbers or not nonnegative numbers;

when the data amounts allowed to be sent by the each to-be-scheduled data queue are nonnegative numbers, determining that the each to-be-scheduled data queue is allowed to send data; and when the data amounts allowed to be sent by the each to-be-scheduled data queue are not nonnegative numbers, determining that the each to-be-scheduled data queue is not allowed to send data.

3. The queue scheduling method according to claim 2, wherein the receiving data amounts actually allowed to be sent by data receiving queues returned by the data receiving queues is performed before the determining whether data amounts allowed to be sent by the each to-be-scheduled data queue are nonnegative numbers.

4. The queue scheduling method according to claim 3, wherein the comparing data amounts theoretically allowed to be sent by the data receiving queues with the data amounts actually allowed to be sent by the data receiving queues is performed before the determining whether data amounts allowed to be sent by the each to-be-scheduled data queue are nonnegative numbers.

5. The queue scheduling method according to claim 4, wherein before the determining whether data amounts allowed to be sent by the each to-be-scheduled data queues are nonnegative numbers, the method further comprises:

adjusting, according to the data amount adjusting parameters, the data amounts allowed to be sent by the each to-be-scheduled data queue.

6. The queue scheduling method according to claim 4, wherein after obtaining the data amount adjusting parameters of the data amounts allowed to be sent by the each to-be-scheduled data queue, the method further comprises performing low pass filtering processing on the data amount adjusting parameters.

7. The queue scheduling method according to claim 6, wherein the adjusting, according to the data amount adjusting parameters, the data amounts allowed to be sent by the each to-be-scheduled data queues comprises:

according to the data amount adjusting parameters that have undergone the low pass filtering processing, adjusting the data amounts allowed to be sent by the each to-be-scheduled data queue.

8. The queue scheduling method according to claim 5, wherein the adjusting, according to the data amount adjusting parameters, the data amounts allowed to be sent by the each to-be-scheduled data queue comprises:

performing calculation according to committed information rates (CIR) and peak information rates (PIR) of the each to-be-scheduled data queue, and the data amount adjusting parameters, to obtain data amount increased values of the data amounts allowed to be sent by the each to-be-scheduled data queue.

9. The queue scheduling method according to claim 8, wherein the adjusting, according to the data amount adjusting parameters, the data amounts allowed to be sent by the each to-be-scheduled data queue further comprises:

adding the data amounts allowed to be sent by the each to-be-scheduled data queue to the data amount increased values, to obtain adjusted data amounts allowed to be sent by the each to-be-scheduled data queue.

10. The queue scheduling method according to claim 1, wherein after the scheduling the each to-be-scheduled data queue corresponding to the queue marks according to the queue marks; and enabling the each to-be-scheduled data queue corresponding to the queue marks to send service data not exceeding predetermined data amounts, the method further comprises:

subtracting service data amounts already sent by the each to-be-scheduled data queue from data amounts allowed to be sent by the each to-be-scheduled data queue.

11. A queue scheduling apparatus comprising:

a processor; and a non-transitory computer readable storage medium storing a program to be executed by the processor, the program including instructions for:

a determination unit configured to determine whether service data exists in each to-be-scheduled data queue, and whether the each to-be-scheduled data queue is allowed to send data, wherein the determining whether service data exists in the each to-be-scheduled data queue as well as the determining whether the each to-be-scheduled data queue is allowed to send data are triggered when a data amount allowed to be sent by the each to-be-scheduled data queue is updated or when the each to-be-scheduled data queue receives new service data, the determination unit comprising a receiving module configured to receive data amounts actually allowed to be sent by data receiving queues returned by the data receiving queues, a comparison module configured to compare data amounts theoretically allowed to be sent by the data receiving queues with the data amounts actually allowed to be sent by the data receiving queues to obtain data amount adjusting parameters of the data amounts allowed to be sent by the each to-be-scheduled data queue, wherein the data amounts actually allowed to be sent are configured to vary with respect to amounts theoretically allowed to be sent, and an adjusting module configured to adjust, according to the data amount adjusting parameters, the data amounts allowed to be sent by the each to-be-scheduled data queue, wherein the data amounts theoretically allowed to be sent are constant values, and the data amount adjusting parameters are based on the data amounts theoretically allowed to be sent and the data amounts actually allowed to be sent;

an enqueuing unit configured to, when the determination unit determines that the service data exists in the each to-be-scheduled data queue and the each to-be-scheduled data queue is allowed to send data, and in response to the determining, place queue marks of the each to-be-scheduled data queue into a mark queue; and a sending unit configured to schedule the queue marks of the each to-be-scheduled data queue from the mark queue in sequence, schedule the each to-be-scheduled data queue corresponding to the queue marks according to the queue marks, and enable the each to-be-scheduled data queue corresponding to the queue marks to send service data not exceeding predetermined data amounts.

12. The queue scheduling apparatus according to claim 11, wherein the determination unit further comprises a first determination module configured to determine whether data amounts allowed to be sent by the each to-be-scheduled data queue are nonnegative numbers.

13. The queue scheduling apparatus according to claim 12, wherein the determination unit further comprises a second determination module configured to, when the first determination module determines that the data amounts allowed to be sent by the each to-be-scheduled data queue are nonnegative numbers, determine that the each to-be-scheduled date queue is allowed to send data, wherein the second determination module is further configured to, when the first determination module determines that the data amounts allowed to be sent by the each to-be-scheduled data queue not nonnegative numbers, determine that the each to-be-scheduled data queue is not allowed to send data.

14. The queue scheduling apparatus according to claim 12, wherein the receiving module is configured to receive data amounts actually allowed to be sent by data receiving queues returned by the data receiving queues before the first determination module determines whether the data amounts allowed to be sent by the each to-be-scheduled data queue are nonnegative numbers.

15. The queue scheduling apparatus according to claim 14, wherein the determination unit further comprises a filtering module configured to perform low pass filtering processing on the data amount adjusting parameters after the comparison module obtains the data amount adjusting parameters of the data amounts allowed to be sent by the each to-be-scheduled data queue.

16. The queue scheduling apparatus according to claim 15, wherein the adjusting module is further configured to adjust the data amounts allowed to be sent by the each to-be-scheduled data queue according to the data amount adjusting parameters that have undergone the low pass filtering processing.

17. The queue scheduling apparatus according to claim 14, wherein the adjusting module is further configured to:

perform calculation according to committed information rates (CIR) and peak information rates (PIR) of the each to-be-scheduled data queue, and the data amount adjusting parameters, to obtain data amount increased values of the data amounts allowed to be sent by the each to-be-scheduled data queue.

18. The queue scheduling apparatus according to claim 17, wherein the adjusting module is further configured to:

add the data amounts allowed to be sent by the each to-be-scheduled data queue to the data amount increased values, to obtain adjusted data amounts allowed to be sent by the each to-be-scheduled data queue.

19. The queue scheduling apparatus according to claim 11, further comprising:

a subtraction unit configured to subtract service data amounts already sent by the each to-be-scheduled data queue from data amounts allowed to be sent by the each to-be-scheduled data queue.

20. The queue scheduling apparatus according to claim 19, wherein the subtraction unit performs a subtraction after scheduling the each to-be-scheduled data queue corresponding to the queue marks according to the queue marks, and enables the each to-be-scheduled data queue corresponding to the queue marks to send service data not exceeding the predetermined data amounts.

21. The queue scheduling method according to claim 4, further comprising determining a congestion degree of a network based on the data amount adjusting parameters.

22. The queue scheduling apparatus according to claim 11, wherein the determination unit is further configured to determine a congestion degree of a network based on the data amount adjusting parameters.

* * * * *

UNITED STATES PATENT AND TRADEMARK OFFICE
CERTIFICATE OF CORRECTION

PATENT NO. : 9,521,086 B2
APPLICATION NO. : 14/171178
DATED : December 13, 2016
INVENTOR(S) : Xingli Xu Page 1 of 1

It is certified that error appears in the above-identified patent and that said Letters Patent is hereby corrected as shown below:

In Column 17, Line 37, Claim 13, delete "queue not" and insert --queue are not--.

Signed and Sealed this
Eighteenth Day of April, 2017

Michelle K. Lee
*Director of the United States Patent and Trademark Office*